United States Patent Office 3,775,393
Patented Nov. 27, 1973

3,775,393
AMMONIA EXTRACTION OF UNICELLULAR MICROORGANISMS
Cavit Akin, Oakbrook, and Kwei C. Chao, Homewood, Ill., assignors to Standard Oil Company, Chicago, Ill.
No Drawing. Filed Dec. 3, 1970, Ser. No. 94,941
Int. Cl. A23j 3/00
U.S. Cl. 260—112                                   9 Claims

ABSTRACT OF THE DISCLOSURE

Improved quality single-cell protein food materials are prepared by extraction of unicellular microorganisms with aqueous ammonia at 90° to 125° C. for from 5 to 60 minutes. Nucleic acids are removed from the cells while the protein content remains high.

BACKGROUND OF THE INVENTION

Recent concern for the welfare of the world population has included consideration of additional means for feeding the rapidly increasing number of people involved. The problem embraces providing both adequate per capita caloric intake and a balanced diet, with particular reference to the acknowledged lack of sufficient protein-affording foods in many parts of the world. One means for providing necessary protein supplies is through the growth of single-cell protein-affording microorganisms, such as yeasts, bacteria and algae, for use as either foods or food supplements.

Production of single-cell protein (SCP) materials in large quantity may be accomplished by fermentation processes employing, for example, carbohydrate, hydrocarbon or oxygenated hydrocarbon materials as substrate. Principal requirements are that the substrate material be inexpensive and readily consumed by the selected microorganism so that process costs are not excessive. Equally important is the acceptability and utility of the SCP material as a food or food component. These latter considerations include taste and odor factors relating to public acceptance as well as metabolic and toxicity factors relating to suitability of SCP material for inclusion in the human diet.

Both the technical and the patent literature describe fermentation processes for production of microorganisms which readily afford useful SCP materials. For example, yeasts have been grown on the carbohydrates contained in waste sulfite liquor, the normal alkane components of a gas oil hydrocarbon fuel, and on a mixture of oxygenated hydrocarbons. Production of bacteria has been similarly described. Fermentation to produce yeasts or bacteria comprises an oxidation process, evolving much heat and requiring both substantial oxygen transfer and good control of fermentation temperature. Preferred substrate materials will already contain as much combined oxygen as possible in order to minimize the heat release and the oxygen requirement. Production of food-grade SCP material may also require an extraction step to limit the presence of undesirable, residual substrate material such as high-molecular-weight hydrocarbons or slowly fermented oxygenated hydrocarbon species.

A number of the fermentation processes planned or in issue currently for production of SCP material are intended to provide primarily an animal feed supplement and hence to supply protein for human consumption only indirectly. However, some microorganisms, notably certain yeasts within the Saccharomycetoideae and Cryptococcoideae sub-families, have been approved by the Food and Drug Administration for direct use in foods intended for human consumption.

The human metabolic system produces uric acid as in the metabolism of ribonucleic acid (RNA). Since man does not have a uricase enzyme system, uric acid is not further broken down and is excreted with urine. Because uric acid has a very low solubility in water it will accumulate in the body in crystalline form if produced in larger quantities than the body can excrete. This may lead to the condition known as gout. It is, therefore, recomended by many nutritionists that the RNA intake in diet be kept at a low level.

Microbial cells, or single-cell protein (SCP) materials, contain from 4% to 30% or more nucleic acids according to their growth rates and the phase of growth. Usually the higher nucleic acid contents of the microbial cells are associated with rapid growth phases. If the microbial cells are to be used as a protein source in human feeding, nutritionists recommend generally that the amount of nucleic acids contributed by SCP to diet should not exceed 2 grams per day.

The calculated RNA contents of some conventional protein sources are given in Table I. These vary from 0 to 4 percent. The RNA content of SCP generally ranges from 8 to 18 percent for exponential growth phase cells. In SCP intended for human consumption the RNA content should preferably be reduced to about 2% on cell dry weight basis.

TABLE I.—RNA CONTENT (CALCULATED) OF VARIOUS PROTEIN SOURCES

| Food: | Percent RNA |
|---|---|
| Milk | 0 |
| Beans | 1.7 |
| Salmon | 2.4 |
| Chicken | 2.9 |
| Beef | 3.7 |
| Pork | 4.1 |
| Liver | 9.3 |
| Anchovies | 14.5 |
| SCP | 8–18 |

A preferred way of utilizing SCP material is in the form of whole cells. Accordingly there is a need for the development of means for removing nucleic acids from within the microbial cells. This is desirably accomplished with a minimum loss of protein materials from within the cells in order to maintain the nutritional attractiveness of such SCP materials.

SUMMARY OF THE INVENTION

Our invention provides a novel process for the removal of nucleic acids from unicellular microorganisms while at the same time surprisingly improving the functional properties of the treated SCP food materials. The invention further provides novel food products, suitable for human consumption, comprising SCP material having greatly reduced content of nucleic acid.

The process of our invention involves the heat treatment of an alkaline ammoniacal slurry of single-cell microorganisms at a temperature within the range from 90° to 125° C. under autogenous pressure. The decomposition of nucleic acid components is thereby induced and leakage of the nuclei acid fragments through the cell wall is effected with relatively little loss of protein material from within the cells.

DESCRIPTION OF THE INVENTION

This invention discloses a novel method for reducing the nucleic acid content of unicellular microorganisms together with the novel and improved food products obtained thereby.

It has been found that most of the nucleic acid content of single-cell microorganisms can be removed by treatment with aqueous ammonia at or near the boiling point under autogenous pressure. The suitable temperature range has been found to extend from about 90° C. up to about 125° C. Although the loss of nucleic acids from within the single-cell organisms is apparently due to the hydrolytic effect of the ammoniacal medium, it was surprisingly noted that the protein material contained within the cells was not affected to the same degree. It has thus been possible, by application of this inventive process, to obtain single-cell protein material in the form of intact cells and having a nucleic acid content substantially below 2 wt. percent.

The practice of this invention is broadly applicable to microorganisms and particularly to those organisms classified as bacteria, yeast and fungi. By way of illustration bacteria such as those listed in Table II, yeast such as those listed in Table III and fungi such as those listed in Table IV are suitable microorganisms.

TABLE II.—SUITABLE BACTERIA

Acetobacter sp.
Arthrobacter sp.
*Bacillus subtilus*
Corynebacteria sp.
Micrococcus sp.
Pseudomonas sp.

TABLE III.—SUITABLE YEASTS

*Candida curvata*
*Candida lipolytica*
*Candida pulcherima*
*Candida utilis*
*Hansenula anomala*
*Hansenula miso*
*Oidium lactis*
*Saccharomyces carlsbergensis*
*Saccharomyces fragilis*
*Trichosporon cutaneum*
*Saccharomyces cerevisiae*
*Candida parapsilosis*
*Hansenula wickerhamii*
*Pichia pastoris*
*Pichia haplophyla*

TABLE IV.—SUITABLE FUNGI

*Aspergillus niger*
*Aspergillus glaucus*
*Aspergillus oryzae*
*Aspergillus terreus*
*Aspergillus itaconicus*
*Penicillium notatum*
*Penicillium chrysogenum*
*Penicillium glaucum*
*Penicillium griseofulvum*

*Candida utilis, Saccharomyces cerevisiae, Saccharomyces fragilis*, and *Saccharomyces carlsbergensis* are preferred starting materials for the process of this invention, however, because each is F.D.A. approved for use in food products.

This invention may be applied to either isolated cellular material or to cells newly grown in a fermentation process. Where the cellular material has been previously isolated it should be slurried with water to provide the desired cell concentration. Where fresh cells are employed the fermentor effluent may be concentrated, as by centrifugation, to provide a suitable slurry.

The concentration of cells in the aqueous slurry may vary within the range from 2 to 20 wt. percent (dry basis) and is preferably held within the range from 5 to 15 wt. percent (dry basis) cells.

The original cell slurry will typically have a pH value of 7.0 or less. Successful practice of this invention requires that the slurry be adjusted to a pH value in the range from 8.0 to 11.0, and preferably from 9.0 to 10.5, by the addition of an aqueous ammoniacal solution. In order to avoid undue dilution it is preferred that a concentrated ammoniacal solution be employed, as for example 30% aqua ammonia. Optionally gaseous ammonia may be employed.

The removal of nucleic acid material may be accomplished by heating the slurry of cells in the alkaline ammoniacal medium to a temperature within the range from 60° to 140° C. and preferably to within a range from about 90° to about 125° C. Because of the significant vapor pressure of ammonia at these temperatures it is preferred to conduct the heat treatment in an enclosed vessel at autogenous pressure. The slurry is preferably held at the selected elevated temperature for at least about 5 minutes. Generally the time preferred for effective treatment will not exceed about 60 minutes. At the higher temperatures the removal of nucleic acids from within the microbial cells proceeds more rapidly. When operating in a typical portion of the temperature range, such as at about 90° to 100° C., the treating time may vary from about 20 to 60 minutes. Preferred operating conditions in this typical temperature range include maintaining the slurry at about 100° C. for about 30 minutes. When operating in the higher portion of the temperature range, such as from about 115° to about 125° C., the slurry should be maintained at the selected temperature for about 5 to 15 minutes. Preferred operating conditions in the higher temperature range include maintaining the ammoniacal slurry at about 120° C. for about 10 minutes.

After the heat treating period is concluded the cells are separated from the aqueous phase, preferably by centrifuging. The treated cells may then be washed with water in the centrifuge or may be washed in a separate slurrying operation followed by an additional separation step, as by centrifugation. The washed cells are then dried by conventional techniques with care being taken not to expose them to extremely high temperatures. It is preferred, for example, to dry the cells by heating at a temperature of about 70° C. If desired, vacuum drying or spray drying may be employed.

The original separation of the treated cells from the ammoniacal slurry may be accomplished by centrifuging at the elevated treating temperature or, if preferred, the slurry may first be cooled to approximately room temperature. When freshly grown single-cell microorganisms are employed in the process of this invention the aqueous ammoniacal phase separated by centrifugation may be sent to the fermentor to provide both nutrient and substrate material for the growth of additional microorganisms. When this aqueous phase, containing both ammonia and substances removed from the cells such as nucleic acids, is separated from the treated cells by centrifuging at or near the temperature employed in the treating process, this aqueous stream may be sent directly to the fermentor, in whole or in part, without an intermediate sterilization. However, where the aqueous phase has first been cooled to approximately room temperature it may be necessary to pasteurize any portion that is sent to fermentor by heating it at about 60° to 70° C. for about 10 to 25 minutes.

The process of this invention is both rapid and reliable. The recovered cell material consistently contains less than 2 percent (dry basis) nucleic acids. The protein content of the treated cells is usually within the range from 45 to 50 wt. percent (dry basis) which corresponds substantially with the protein content of the original cells. Desirable physical properties, including taste and odor, are not harmed by the process of this invention and the resulting SCP food material has been substantially improved in its nutritional characteristics. Surprisingly, the functional properties; i.e., texturizing characteristics, water and oil retention, low dispersibility in water, and the like are greatly improved. Accordingly, the SCP food materials of this invention possess great versatility relative to incorporation in conventional food products and to development of new food products.

SPECIFIC EMBODIMENTS OF THE INVENTION

The following examples are illustrative, without implied limitation, of our invention.

Example I

*Candida utilis* (ATCC 9256) was grown in a 14-liter fermentor in a mineral medium and ethanol substrate with a 0.3 hr.$^{-1}$ space velocity. The cells obtained from the fermentor were centrifuged and rediluted to obtain a 10 wt. percent (dry basis) cell slurry. Ten ml. portions of the slurry were put in vials and ammonia, phosphoric acid and glucose were added to vials. The vials were sealed and autoclaved 10 minutes under 14.7 p.s.i. pressure at 121° C. The vials were cooled to room temperature and the cells were separated by centrifugation. The residue was washed with distilled water twice and dried at 70° C. The dry cells were ground to a powder and their nucleic acid contents were determined as presented in Table V.

TABLE V.—NUCLEIC ACID REMOVAL BY EXTRACTION

| Sample | Additive | pH | Nucleic acid remaining in cells[1] |
|---|---|---|---|
| Control (no treatment) | | | 10.5 |
| 10 ml. 10% fresh cell slurry. | None | 6 | 8.3 |
| Do | 0.2 ml. conc. H$_3$PO$_4$ | 1.9 | 3.3 |
| Do | 0.2 ml. 30% aqua ammonia | 9.5 | 1.7 |
| Do | 0.5 ml. 30% aqua ammonia | 9.9 | 1.3 |
| Do | 1.0 ml. 30% aqua ammonia | 10.3 | 1.3 |
| Do | 0.2 g. glucose | 5.8 | 8.45 |

[1] As percent of final dry weight.

The treated cells possessed a bland taste with no bitterness. The treated cells could be worked into an aqueous paste which was not dispersible in water, thus indicating a significant improvement in functional properties.

Example II

Fresh Torula yeast (*Candida utilis*) from a fermentor was concentrated to a 10 wt. percent (dry basis) slurry by centrifugation. One 10 ml. sample without any additive and one 10 ml. sample with 1 ml. ammonia (30%) addition were heated 30 minutes in a boiling water bath. (The pH values of the samples were 6.1 and 9.2, respectively.) The cell slurries were then cooled and centrifuged. The residues were twice suspended in 10 ml. distilled water and recentrifuged. The supernatants were combined for each sample and the nucleic acid contents of the combined supernatants were determined and the amount of nucleic acids which leaked out of the cells were calculated. The fresh cells from the fermentor contained about 9.5% of their dry weight as nucleic acids. The leakage from the "no additive" sample corresponded to 3.4% of the original cell dry weight, while in the "ammonia added" sample the nucleic acid leakage corresponded to 8.1% of the original cell dry weight. The respective nucleic acid contents of the treated yeast samples acccordingly were 6.1 and 1.4 wt. percent.

We claim:

1. A process for substantially improving the nutritional and functional properties of single-cell protein (SCP) material food products derived from unicellular microorganisms, comprising the steps of:
   (a) providing an aqueous slurry of SCP material comprising from 5 to 15 wt. percent cells;
   (b) adding to the slurry sufficient aqueous ammonia to bring the slurry to a pH value within the range from 9.0 to 10.5;
   (c) heating the ammoniacal slurry to a temperature within the range from 90° to 125° C. at autogenous pressure;
   (d) maintaining the ammoniacal slurry at the elevated temperature for from 5 to 60 minutes, to induce leakage of nucleic acid fragments from the cells;
   (e) centrifuging the slurry to provide an aqueous phase, comprising ammonia and nucleic acid leakage products, and a slurry phase, comprising SCP material having a reduced content of nucleic acids;
   (f) washing the SCP-material slurry phase with water; and
   (g) drying the washed SCP material.

2. The process of claim 1 wherein the cell slurry contains about 10 wt. percent cells and the pH of the slurry is maintained within the range from 9.5 to 10.3 by the addition of 30% aqua ammonia.

3. The process of claim 1 wherein the ammoniacal slurry is maintained at a temperature within the range from about 90° to about 100° C. for from 20 to 60 minutes.

4. The process of claim 3 wherein the ammoniacal slurry is maintained to about 100° C. for about 30 minutes.

5. The process of claim 1 wherein the ammoniacal slurry is maintained at a temperature within the range from about 115° to about 125° C. for from 5 to 15 minutes.

6. The process of claim 5 wherein the ammoniacal slurry is maintained at about 120° C. for about 10 minutes.

7. The process of claim 1 wherein the unicellular microorganism is a bacteria or yeast.

8. The process of claim 7 wherein the microorganism is a yeast selected from the class consisting of *Saccharomyces cerevisiae*, *Saccharomyces carlsbergensis*, *Saccharomyces fragilis* and *Candida utilis*.

9. The process of claim 8 wherein the yeast is *Candida utilis*.

References Cited

UNITED STATES PATENTS

| 3,615,654 | 10/1971 | Ayukawa | 99—97 |
| 1,213,545 | 1/1917 | Ringler et al. | 99—97 |
| 3,639,210 | 2/1972 | Tanaka et al. | 195—28 |

A. LOUIS MONACELL, Primary Examiner

R. M. ELLIOT, Assistant Examiner

U.S. Cl. X.R.

195—28 N